US008731919B2

(12) United States Patent
George

(10) Patent No.: US 8,731,919 B2
(45) Date of Patent: May 20, 2014

(54) METHODS AND SYSTEM FOR CAPTURING VOICE FILES AND RENDERING THEM SEARCHABLE BY KEYWORD OR PHRASE

(75) Inventor: Alex Kiran George, Tampa, FL (US)

(73) Assignee: Astute, Inc., Columbus, OH (US)

( * ) Notice: Subject to any disclaimer, the term of this patent is extended or adjusted under 35 U.S.C. 154(b) by 852 days.

(21) Appl. No.: 12/288,261

(22) Filed: Oct. 16, 2008

(65) Prior Publication Data

US 2009/0099845 A1 Apr. 16, 2009

Related U.S. Application Data

(60) Provisional application No. 60/980,267, filed on Oct. 16, 2007.

(51) Int. Cl.
| | |
|---|---|
| *G10L 15/18* | (2013.01) |
| *G10L 15/26* | (2006.01) |
| *G10L 15/19* | (2013.01) |
| *G10L 15/183* | (2013.01) |

(52) U.S. Cl.
CPC .............. *G10L 15/19* (2013.01); *G10L 15/183* (2013.01)
USPC ........................................ 704/235; 704/270

(58) Field of Classification Search
CPC ...... G10L 15/183; G10L 15/19; G10L 15/193
USPC ......................................... 704/251, 270, 235
See application file for complete search history.

(56) References Cited

U.S. PATENT DOCUMENTS

| | | | | |
|---|---|---|---|---|
| 6,278,772 | B1 * | 8/2001 | Bowater et al. | 379/88.13 |
| 6,973,428 | B2 * | 12/2005 | Boguraev et al. | 704/251 |
| 7,184,957 | B2 * | 2/2007 | Brookes et al. | 704/246 |
| 7,272,558 | B1 * | 9/2007 | Soucy et al. | 704/235 |
| 8,046,220 | B2 * | 10/2011 | Agarwal et al. | 704/235 |
| 8,301,448 | B2 * | 10/2012 | Carus et al. | 704/257 |
| 8,438,024 | B2 * | 5/2013 | White | 704/235 |
| 2002/0147592 | A1 * | 10/2002 | Wilmot et al. | 704/270.1 |
| 2003/0009335 | A1 * | 1/2003 | Schalkwyk et al. | 704/257 |
| 2003/0125948 | A1 * | 7/2003 | Lyudovyk | 704/257 |
| 2004/0008828 | A1 * | 1/2004 | Coles et al. | 379/88.01 |
| 2004/0210443 | A1 * | 10/2004 | Kuhn et al. | 704/276 |
| 2005/0065796 | A1 * | 3/2005 | Wyss et al. | 704/270 |
| 2005/0069095 | A1 * | 3/2005 | Fellenstein et al. | 379/88.02 |
| 2005/0132272 | A1 * | 6/2005 | Bodin et al. | 715/513 |
| 2005/0171926 | A1 * | 8/2005 | Thione et al. | 707/1 |
| 2006/0264209 | A1 * | 11/2006 | Atkinson et al. | 455/422.1 |
| 2007/0043868 | A1 * | 2/2007 | Kumar et al. | 709/226 |

(Continued)

*Primary Examiner* — Jialong He
(74) *Attorney, Agent, or Firm* — Porter Wright Morris & Arthur LLP

(57) ABSTRACT

A system for capturing voice files and rendering them searchable, comprising one or more devices capable of capturing audio speech electronically, a recorder coupled to the devices for retrieving audio speech, a controller coupled to the recorder, a recognition engine adapted to transcribe audio speech into text, and a database system is disclosed. In the system, the controller causes the recorder to capture audio speech from at least one of the devices, the recorder stores the audio speech as data in the database system, and the recognition engine subsequently retrieves the audio speech data, transcribes the audio speech data into text, and stores the text and data associating the text data with at least the audio speech data in the database system for subsequent retrieval by a search application.

17 Claims, 1 Drawing Sheet

(56) References Cited

U.S. PATENT DOCUMENTS

| | | |
|---|---|---|
| 2007/0286358 A1* | 12/2007 | Pomerantz et al. .......... 379/67.1 |
| 2008/0021710 A1* | 1/2008 | Ho .............................. 704/270.1 |
| 2008/0130699 A1* | 6/2008 | Ma et al. .................... 372/50.12 |
| 2008/0153465 A1* | 6/2008 | Evermann et al. .......... 455/414.1 |
| 2008/0162472 A1* | 7/2008 | Cheng et al. ....................... 707/6 |
| 2008/0228494 A1* | 9/2008 | Cross .............................. 704/275 |
| 2009/0030680 A1* | 1/2009 | Mamou ......................... 704/235 |
| 2009/0138262 A1* | 5/2009 | Agarwal et al. ............... 704/235 |

\* cited by examiner

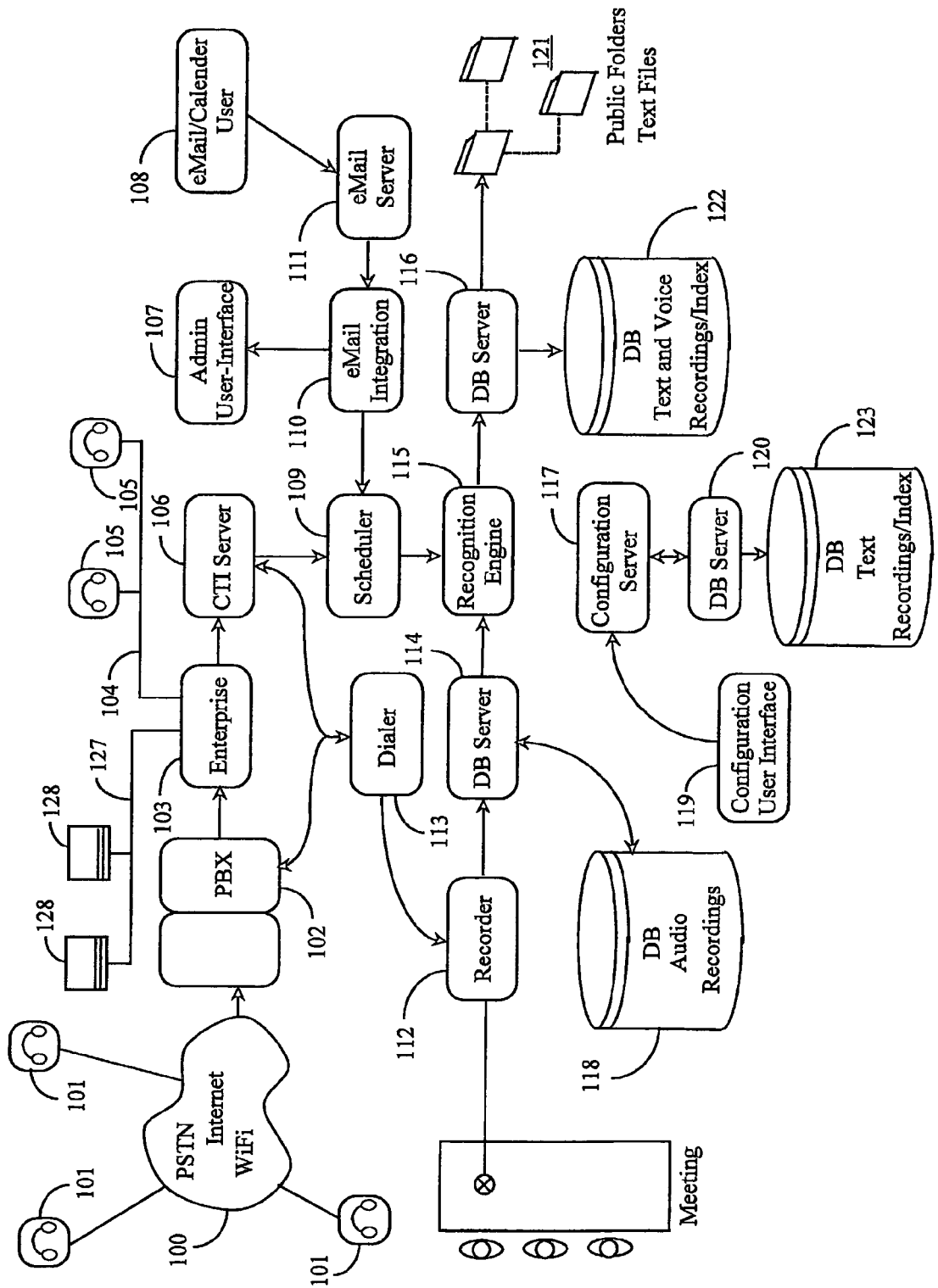

METHODS AND SYSTEM FOR CAPTURING VOICE FILES AND RENDERING THEM SEARCHABLE BY KEYWORD OR PHRASE

CROSS-REFERENCE TO RELATED APPLICATIONS

The present application claims priority to Provisional Application Ser. No. 60/980,267, filed Oct. 16, 2007, the disclosure of which is hereby incorporated in its entirety by reference.

BACKGROUND OF THE INVENTION

1. Field of the Invention

The present invention is in the field of networked voice communications systems including private and enterprise systems and pertains particularly to methods and a system for capturing voice in enterprise operations, and rendering captured data as machine-readable text with a high degree of accuracy, which may be searched by keyword or phrases.

2. Discussion of the State of the Art

Experience shows that typically only about forty percent of enterprise knowledge is ever recorded as searchable text that may be drawn upon for review and discussion. About sixty percent is spoken information that "escapes" in meetings, telephone calls and conferences that are never recorded and converted to text. Knowledge—in the form of tacit knowledge, informal knowledge, meeting knowledge, decision knowledge, and product knowledge—is thus lost or delayed in enterprise operations.

Although some enterprises record at least some telephone calls and meetings, these audio files often accumulate in specialized data stores or on specialized hardware that is not readily accessible to business users and common business applications. Accordingly, recovering applicable portions of an audio stream for a specific purpose can be a tremendous challenge. What is clearly needed is a system and methods for systematically capturing voice data and for rendering that data very accurately as searchable text, and for providing association between the resulting searchable text and the original recordings.

SUMMARY OF THE INVENTION

In an effort to solve the problem of systematically capturing relevant voice data and rendering that data very accurately as text suitable for use with a search application such as an enterprise search engine, the inventors conceived the present invention.

More specifically, in a preferred embodiment a system for capturing voice files and rendering them searchable is disclosed that comprises one or more devices capable of capturing audio speech electronically, a recorder coupled to the devices for retrieving audio speech, a recognition engine adapted to transcribe audio speech into text; and a database system. In the embodiment, the recorder captures audio speech from at least one of the devices and stores the audio speech as data in the database system, and the recognition engine subsequently retrieves the audio speech data, transcribes the audio speech data into text, and stores the text and data associating the text data with at least the audio speech data in the database system for subsequent retrieval by a search application.

In another preferred embodiment, a system for capturing voice files and rendering them searchable is disclosed, comprising one or more devices capable of capturing audio speech electronically, a recorder coupled to the devices for retrieving audio speech, a controller coupled to the recorder, a recognition engine adapted to transcribe audio speech into text, and a database system. In this embodiment, the controller causes the recorder to capture audio speech from at least one of the devices, the recorder stores the audio speech as data in the database system, and the recognition engine subsequently retrieves the audio speech data, transcribes the audio speech data into text, and stores the text and data associating the text data with at least the audio speech data in the database system for subsequent retrieval by a search application.

In yet another preferred embodiment of the invention, a method for capturing voice files and rendering them searchable is disclosed, comprising the steps of recording audio speech data from at least one audio-capable device, storing the audio speech data in a database, retrieving the audio speech data and transcribing it into text using a recognition engine, creating at least one data element associating the text with the audio speech data, and storing the text and the associated data elements in a database for future access by a search application.

In a further preferred embodiment, a method for capturing voice files and rendering them searchable is disclosed, comprising the steps of sending a signal from a controller to a recorder, then, on receipt of the signal by the recorder, recording audio speech data from at least one audio-capable device, storing the audio speech data in a database, retrieving the audio speech data and transcribing it into text using a recognition engine, creating at least one data element associating the text with the audio speech data, and finally storing the text and the associated data elements in a database for future access by a search application.

In another preferred embodiment, a system for capturing voice files and rendering them searchable is disclosed, comprising one or more devices capable of capturing audio speech electronically, a recorder coupled to the devices for retrieving audio speech, a controller coupled to the recorder, a recognition engine adapted to transcribe audio speech into text, a database system, and a configuration server. In this embodiment, the controller, based on at least one configuration rule provided by the configuration server, causes the recorder to capture audio speech from at least one of the devices, and the recorder stores the audio speech as data in the database system, and the recognition engine subsequently retrieves the audio speech data, transcribes the audio speech data into text using at least one configuration rule provided by the configuration server, and stores the text and data associating the text data with at least the audio speech data in the database system for subsequent retrieval by a search application.

In another preferred embodiment of the invention, a method for capturing voice files and rendering them searchable is disclosed that comprises the steps of configuring rules for capturing voice files and rendering them searchable, sending a signal from a controller to a recorder in accordance with at least one configuration rule, recording audio speech data from at least one audio-capable device on receipt of the signal by the recorder, storing the audio speech data in a database, retrieving the audio speech data and transcribing it into text using a recognition engine acting according to the configuration rules, creating at least one data element associating the text with the audio speech data, and finally storing the text and the associated data elements in a database for future access by a search application.

BRIEF DESCRIPTION OF THE DRAWING FIGURES

FIG. 1 is an architectural view of a system for practicing the present invention in one embodiment.

DETAILED DESCRIPTION

FIG. 1 is an architectural view of a system for practicing the present invention in one embodiment wherein two or more people may be engaged in voice conversation, either directly or by telephone. The primary example described below with reference to FIG. 1 relates principally to voice conferences, such as telephone conferences, in an enterprise, where two or more people may be discussing business matters, but this example should not be considered as limiting, as the invention may be practiced in any situation where potentially valuable information may be voiced, even by a single person not in conversation with another. For example, the present invention can in various embodiments make possible the searching of recorded lecture notes, all calls associated with any one phone set or with any one group of phone sets, or even audio content proactively gathered by a third party application and submitted to the recognition engine 115 for recognition, indexing and searchable storage. Also, the capture of voice files is not limited to the capture of complete conversations, meetings, conference calls or other events. In an embodiment of the invention, the capture of speech can be interactively controlled by the system or by participants in the audio event, as described below in exemplary form.

FIG. 1 represents an enterprise 103, which also comprises a variety of facilities, hardware, communications equipment and the like which may typically be present in a modem business enterprise, for example a conference room 124 having a telephone system 126 with speakerphone capability and a microphone 125, a local area network 127 to which computers 128 may connect, and internal phone lines 104 usable by employees with telephones 105, among other elements shown in FIG. 1 and not shown. The nature of FIG. 1 is to illustrate elements in the invention and interaction and relationship between those elements in one embodiment, and is not meant to illustrate every interconnection, The nature of electronic and electrical interconnection between such elements is well known to the skilled artisan.

In various embodiments of the present invention a system of hardware and intelligence known to the inventor as Enterprise Voice Search (EVS), implemented in the enterprise includes a recorder 112, illustrated as a server in FIG. 1, which is enabled to monitor voice communications in the enterprise in a variety of ways and at a variety of levels. For example, a common and well-known mode of interaction between members of the enterprise is a telephone conference, which may take place among enterprise members using internal telephones 105, which may be implemented on internal lines 104, or using data network telephony over enterprise LAN 127. Such telephone conferences may also include conferees external to the enterprise using telephony equipment 101 through external networks 100, which may include many sorts of networks and equipment in the art. Conferees may also include persons in a meeting room 124 using perhaps a speaker phone 126 or one or more microphones 125. Recorder 112 is implemented to have access to the voice audio in all such situations.

In various embodiments of the invention voice interactions as described above are monitored and recorded by recorder 112, which interacts with a database (DB) server 114 to prepare, mark and store audio speech recordings identified according to a variety of criteria, such as time, place, person, purpose, and the like in data store 118. Such audio speech recordings are further processed by a speech recognition engine 115 to transcribe the voice files as text, interacting with another DB server 116 which manages storing of the text versions in a DB 122, along with indexing of the text to the voice files, along with other data that associates the text with the audio speech data, which may include participants' names, a conference name, duration, agenda of a conference, summaries, and the like. Further features and capabilities of the recognition engine in various embodiments are described more fully below. In some embodiments DB servers 112 and 116 may be implemented in one server, and DBs 118 and 122 may be implemented as a single DB, but are illustrated separately herein for greater clarity in describing functions of the invention in various aspects.

A telecommunications conference or meeting in enterprise 103 is typically pre-planned and the conference or meeting is scheduled ahead of time. In some cases meetings and conferences may be scheduled as regular events. An object of the invention is to ensure that these regularly scheduled and other conferences are attended by the EVS. This is accomplished in part by a dedicated controller such as scheduler component 109, which keeps a schedule of meetings and conferences. The schedule may be built and managed in a number of ways, one of which is through to provide an interactive interface such as administrative interface 107 to authorized employees, who may use the interface to edit the existing schedule or to add new meetings to the overall schedule.

Scheduler 109 in the embodiment shown operates with email integration server 110 to notify conferees of upcoming meetings and telephone conferences. In some cases an application such as Microsoft® Outlook may be used for scheduler 109, and in some cases other software may be used. Administrators have access through Administrative Interface 107.

In one example, at some prearranged time before a telephone conference is to take place, scheduler 109, through email, notifies persons scheduled to attend that the conference is still arranged and their participation is expected or desired, and also published the telephone access information for a conference bridge. The bridge can be either an internal bridge or an external bridge, such as that offered by many telecommunications service providers. In preferred embodiments, the bridge is under the control of the EVS system scheduler. It is well-known in the art that dual-tone multiple-frequency (DTMF) tones can be used to control external conference bridges. In either case (internal or external bridge under control of the EVS), the EVS system can be equipped with text-to-speech capability and may thus introduce the conference, ask conferees to state their names, and perhaps provide other useful information. For example, the EVS system could recite the planned agenda to the conferees. The EVS system notes the identities of the conferees, the purpose of the meeting or conference (which is typically included in the meeting invite information in the scheduling system, or could be provided verbally by the leading participant in the conference), and optionally the planned agenda. In the instance of telephone access the EVS may identify and track voice input to determine speaker identities by the nature of the telephone equipment, or by channel separation, or in other cases by accessing previously stored voice samples for identified persons and matching persons by comparison with such samples. Since the identities of expected attendees is known in advance in most cases, any speaker identification application will be able to choose from a small set of potential matches, thus improving the accuracy of the identification of speakers. In still other cases tracking and identification may be made by recording a voice print at the time of introduction into the conference. Other intelligence may be used as well, such as name recognition during the conference.

In other embodiments the EVS may be invited to a meeting or conference that may have been initiated outside the EVS system. Such meetings or conferences may be impromptu (that is, not scheduled), and a facility is made to dial in to the EVS system. For example, hosts or participants in conferences could be provided, through the scheduling system or through other means, with a dial-in number to which they can dial in order to add the EVS system to an ongoing or a new conference, or even to a regular two-party phone call. In still another embodiment the EVS system may use dialer 113 in association with CTI server 106 and PBX 102 in order to dial conference participants both inside and outside the enterprise and to initiate the conference.

In some embodiments the EVS is notified of incoming or outgoing calls involving at least one party within an enterprise. Through a variety of means well established in the art, such as action buttons within a messaging system, key combinations on phone handsets or voice commands, one or more of the enterprise participants may request that the call be recorded and made searchable. Configuration rules could be set up which specify that calls to or from particular phone numbers will always be recorded, or that calls to or from particular participants within or without the enterprise will always be recorded. It will be understood that announcements can optionally made informing one or more, or all, of the participants in a call that the call is or might be recorded. The decision of whether and how to announce recording is a business decision that will likely involve regulatory, privacy and risk mitigation issues and will thus require custom configuration at each enterprise; what is clear, though, id that means are well established in the art for making such announcements should they be required.

If a conference or call includes participants that are not employees or otherwise associates of the enterprise, EVS may make an announcement that informs those persons that the conference will be recorded, and then provide options for such persons to leave the conference, to prevent their audio from being recorded, or to make some other adjustment. Once the conference begins, EVS, through recorder 112 in association with DB Server 114 and database 118, records some or all voice audio. In some embodiments recordings may be of a preset time duration, after which a file is created and stored, and another file is opened for recording. In a preferred embodiment a new audio file is created and stored for each speaker in the conference, and the file is tagged as associated with that person and with the conference identity. When a conference is finished all of the files for that conference are stored and associated with the conference identity and the date and time.

FIG. 1 shows an illustrative embodiment of the invention using conventional enterprise infrastructure elements. However, there is a great deal of variety of architectures in use in enterprises due to rapid evolution of computing and telecommunications technologies. For example, FIG. 1 discloses a PBX 102 but it should not be supposed that the invention is limited to embodiments in which audio speech is limited to conventional telephone calls carried via a PBX. For instance, a media gateway could be used to switch telephone calls instead of a PBX. Or, telephone calls could be made directly from one IP-enabled endpoint to another, and an IP-capable recorder 112 could be conference in using well-known SIP or other IP call control functions to accomplish the conference call setup. Or audio speech could be captured by a user recording lecture notes or a sales presentation by another using the microphone embedded in the user's laptop and readily available software such as Microsoft® OneNote to record the audio speech. The recorded audio speech file could then be emailed to a recorder 112 which in this example would be an email client adapted to receiving such emails and storing the audio speech data in database 118. The conference call setup and recording method illustrated in FIG. 1 and disclosed herein is thus one of many embodiments by which audio speech data can be captured and stored in database 118.

For each conference or meeting, at some time after commencement, but not necessarily after closure, a recognition engine 115 begins to render each voice file as text. As each file is rendered as text in a first pass, a text file is prepared and stored in database 122, the data being associated with the audio speech file in database 118, and bearing tags that permit cross-referencing between the audio and text versions. It is well-known that speech recognition typically works by loading a set of matched text and audio or reduced audio feature sets corresponding to expected words and phrases, said sets being known in the art as grammars, and matching the audio speech recorded with the audio or reduced audio feature sets in the grammar, and then using the text version from the grammar as the text to be recorded. To be effective it is not practical to operate with a grammar having every possible word and phrase in a language so specialized grammars may be stored and accessible for particular purposes.

In one embodiment of the present invention recognition engine 115 considers, before beginning text rendition, the name and purpose of the conference, and may also consult historical records of past conferences, and grammars that may have been used for similar conferences, and loads one or more grammars accordingly. Grammars may also be loaded based on the identities of the participants. For example, each participant's organization role can be used to determine grammar selection (for instance, if many of the participants are from the finance department, then a finance-based grammar may be loaded); in another example, each participant's idiomatic language preferences may be stored and used to load individual-specific grammars in order to improve recognition accuracy. In the same or another embodiment engine 115 may perform text parsing on attachments sent with the conference invitation to determine what grammar to load based at least in part on the existence of keywords or key phrases in the attachments. In the same or another embodiment a web page, web form, or form-based email may be provided to the organizer of the conference to allow the organizer to specify what the subject matter of the conference is expected to be in order to enable engine 115 to load appropriate grammars. In the same or another embodiment engine 115 may load grammars according to specific words or phrases it may recognize as being used in the conference. In some cases there may be thresholds for switching grammars, such as a list of words and phrases that must be noted before the new grammar may be loaded.

In the art it is typical to do voice to text in a single pass. In the present invention recognition engine 115 in some embodiments is enabled to revisit voice files and text files multiple times after original rendition, to improve the accuracy of the text versions. These multiple passes can be performed in series or in parallel, for instance by using multiple processor cores or process threads processing the same audio speech data simultaneously using different grammars. For example, in an embodiment an initial pass is performed during the conference, and new grammars are optionally loaded during the conference based on the recognized words and phrases, and then after the conference additional passes are performed in order to improve recognition accuracy before the text is submitted to the searchable database 122 permanently. In another embodiment, human operators assist in the process by correcting recognition results during a conference, either based on obvious misrecognitions recognized by the humans during review of the text output of the first pass, or based on the operator's listening to portions of the conference. Alternatively, audio speech recordings and preliminary text transcriptions are sent to humans operating in a low-cost region who perform or assist in the performance of the later passes after the conference is completed but before the data is loaded into the searchable database 122 permanently. In some embodiments, database 122 is segregated into provisional text and finalized segments; search results from the finalized segment would typically be provided to users of enterprise search engines before search results from the provisional segment, unless the person has specified that he is searching for the occurrence of certain words or phrases in a specific conference and that conference has not yet been processed and submitted to the finalized segment.

EVS, over time, produces for an enterprise rich, searchable text versions of substantially all conferences and meetings, capturing valuable business intelligence that would otherwise be lost. Moreover, interactive interfaces accessible in the enterprise by various personnel allow searching of all of this intelligence. Not only may the bulk of the text be searched, but it may be searched and referenced by subject matter, by meeting type, by conference purpose, by personal identification of one or more of the meeting or conference participants, and in many other ways as well. In some embodiments commercially available search applications are used, and in some other embodiments a proprietary search system may be used. A knowledge worker or other person may access text through search and index, and the also revisit the audio for better understanding. EVS thus removes all uncertainty concerning who said what, when and whether or not it was really said. The natural result is a substantially enhanced ability for management to make more effective plans and strategy, and to act on all of the additional intelligence. In some embodiments some personnel such as administrators or conference organizers may be given the capability of reviewing text and audio together and correcting the transcription, or tagging the text with category or subject labels. These corrections are entered into the permanent database 122 of text transcriptions, and can also be used to perform additional voice recognition passes for the existing conference and to correct grammars and grammar selection rules for future conferences. In all of the preceding it should be understood that "conference" is used in an exemplary way only; all of the listed functions can be performed in the respective embodiments with reference to two-party calls, recorded voice mails, two-person meetings without a phone (using a microphone and computer to capture the audio and feed it into the EVS), or even to allow for example consumers to provide voice commentary in a retail establishment, perhaps in response to printed questions or even interactive question and answer sessions. Essentially any voice content collectable by an enterprise can be fed in to the EVS, transcribed automatically or semi-automatically into text, and stored and indexed in database 122 for later searching using search engine capabilities well-known in the art.

Referring again to FIG. 1, a configuration server 120 is provided having a configuration interface 119 through which the EVS configuration may be set, tested, and fine tuned. The configuration system works with a database 123 which stores a variety of configuration data which may be applied at different times in the enterprise, and provides for functions to prepare other configurations, and to edit existing configurations. In some cases database 123 stores an index associating text and the audio speech recordings from which the text was transcribed. This index can be consulted by personnel engaged in mining the accumulated knowledge made available by EVS. Again, it should be noted that the database 123 could in some embodiments be coresident with the databases 112 and 122 in any combination, and these databases could be served to other applications by one or several database servers such as 114, 116, and 120 in FIG. 1. It will be appreciated by those skilled in the art that database systems can be configured in a variety of desirable ways without detracting from the distinct functionality associated with each of the databases described above.

Configuration server 117 manages and enables security functions for the EVS platform, and records security levels, access rights, and the like. Additionally, the configuration server may in some embodiments store information about the actual searches performed by various users in order to provide an audit trail and to ensure that security parameters were observed. Other examples of configuration information that is stored in database 123 under the control of configuration server 120 are rules concerning when audio speech is to be recorded and rules concerning what grammars are to be loaded for different types of voice sources (conference calls, meetings, particular individuals or groups of individuals, and the like), and rules specifying how grammars are to be dynamically loaded or unloaded based on factors as discussed above (for example, preliminary text transcription content, user interactions such as audio tagging or transcription correction, or changes in agenda topics as the call/meeting progresses). Also, the prompts and response for making changes, such as for a user's signification that a new agenda item is being started, are configured using the configuration server 120.

In some embodiments of the invention, the email and scheduling functions are integrated (as when an enterprise uses applications such as Microsoft® Exchange Server), while in other embodiments the email and scheduling functions are separated (as when a user uses Apple® iCal for scheduling and Apple® Mail for email). The embodiment shown in FIG. 1 illustrates one of these architectures, but should not be taken as limiting. It is not an essential element of the invention that the email and scheduling functions be tightly integrated, and indeed communications means other than email can be used to signal the presence of an audio stream that contains speech to be captured and made searchable. For example, as discussed above, a user could signal the need for speech capture and thus cause the invention to begin capturing speech even though no scheduling or emailing was accomplished at all. In the exemplary embodiment just described a signal is sent in real time to the recording system by a user using one of several means known in the art (such as DTMF or via a button in a desktop application that is integrated via CTI with the PBX). In another exemplary embodiment, an audio-capable device could continuously receive audio and be coupled to a speech-detection circuit such as is known in the art (for example, answering machine detection circuits perform this function), and only capture "speech" when the speech detection circuit "tells" it to. In a limiting case, an audio device could continuously feed audio data to the recorder 112 which would, in turn, divide the audio into discrete files and store the data in the database 118. This approach is generally limited by the large amounts of data storage required, but it nevertheless is an embodiment of the present invention.

It will be apparent to one with skill in the art that the voice capture and search system of this invention may be provided using some or all of the described features and components without departing from the spirit and scope of the present invention. It will also be apparent to the skilled artisan that the embodiments described above are exemplary in nature.

What is claimed is:

1. A system for capturing voice files and rendering them searchable, comprising:
   (a) a database system having a plurality of grammars stored therein;
   (b) at least one device that electronically captures audio speech for a conversation between two or more participants;
   (c) a recorder coupled to said at least one device, the recorder capturing audio speech from the device for storage as audio speech data in said database system; and
   (d) a speech recognition engine adapted to
      transcribe the audio speech data into machine-readable text data in a plurality of transcription passes using grammars selected from said plurality of stored grammars, and
      store the machine-readable text data as well as data associating the machine-readable text data with the corresponding audio speech data in the database system for subsequent retrieval by a search application;
   wherein the speech recognition engine is adapted to select a grammar from said database system prior to performing a first transcription pass, the grammar for a first transcription pass selected on the basis of
      information pertaining to the subject matter or purpose of the conversation, and
      information pertaining to one or more of the participants,
   and further wherein the recognition engine is adapted to revise the machine-readable text data for the conversation by performing a subsequent transcription pass on the audio speech data using a grammar which was not used in the first transcription pass.

2. The system of claim 1 further comprising:
   a controller coupled to the recorder, the controller causing the recorder to capture audio speech from said at least one device.

3. The system of claim 1 wherein the system is adapted to index the machine-readable text data, the index searchable and selected from the group consisting of subject matter, meeting type, conference purpose, and participant personal identification.

4. The system of claim 1, wherein the speech recognition engine is adapted to receive information regarding the subject matter or purpose of the conversation prior to the conversation taking place.

5. The system of claim 4, further comprising a scheduler for scheduling a telephone conversation between two or more participants and providing the information regarding the subject matter or purpose of the conversation to the speech recognition engine for use in selecting the grammar for the first transcription pass.

6. The system of claim 1, wherein the system is adapted to determine the identities of participants, and further wherein the speech recognition engine is adapted to select the grammar for the first transcription pass on the basis of the determined identity of one or more of the participants.

7. The system of claim 6, wherein the system is adapted to determine the identities of participants based on stored voice samples.

8. The system of claim 1, wherein said at least one device for capturing audio is adapted to electronically capture audio speech from a telephone conference between two or more participants, said system further comprising a scheduler adapted to schedule such a telephone conference, provide telephone access information to participants, and provide information regarding the subject matter of a scheduled telephone conference to the speech recognition engine.

9. The system of claim 1, wherein the speech recognition engine is adapted to select a plurality of grammars from said database system prior to performing a first transcription pass, the plurality of grammars selected on the basis of:
   (a) received information pertaining to the subject matter or purpose of the conversation, and
   (b) received information pertaining to one or more of the participants.

10. The system of claim 1, wherein said system is adapted to store audio speech data in the database system as a plurality of files, with each file associated with a different participant.

11. The system of claim 1, wherein the grammar used for the subsequent transcription pass is selected based on the content of the machine-readable text data resulting from the first transcription pass.

12. A computer-implemented method for capturing voice files and rendering them searchable, comprising the steps of:
   (a) recording audio speech data for a conversation between two or more participants, said audio speech data obtained from at least one audio-capable device;
   (b) storing the audio speech data in a database system;
   (c) selecting and loading into a speech recognition engine a grammar selected from a plurality of stored grammars, wherein said grammar is selected prior to the transcribing step and is selected on the basis of
      information pertaining to the subject matter or purpose of the conversation, and
      the identity of one or more of the participants;
   (d) transcribing the audio speech data into machine-readable text data using the speech recognition engine employing said grammar;
   (e) creating at least one data element associating the machine-readable text data with the corresponding audio speech data;
   (f) storing the machine-readable text data and the associated data element in a searchable database; and
   (f) revising the machine-readable text data by performing a subsequent transcription pass on the audio speech data using another grammar which is different than the previously selected grammar.

13. The method of claim 12, wherein said conversation is a telephone conference, and further comprising the steps of identifying and tracking voice input in order to determine speaker identities.

14. The method of claim 12, wherein said conversation is a scheduled telephone conference, and further comprising the step of receiving from an organizer of the telephone conference information regarding the subject matter of the telephone conference such that the grammar selected prior to the transcribing step is selected on the basis of said received information regarding the subject matter of the telephone conference.

15. The method of claim 14, further comprising the step of determining the identities of telephone conference participants.

16. The method of claim 14, further comprising the step of determining the identities of telephone conference participants based on stored voice samples.

17. The method of claim 12, wherein said audio speech data is stored in the database system as a plurality of files, with each file associated with a different participant.

* * * * *